May 6, 1958
F. BERRY
2,833,308
MULTIPLE CONTROL VALVE FOR FLUID
PUMPS, MOTORS AND TRANSMISSIONS
Filed June 2, 1955
9 Sheets-Sheet 6
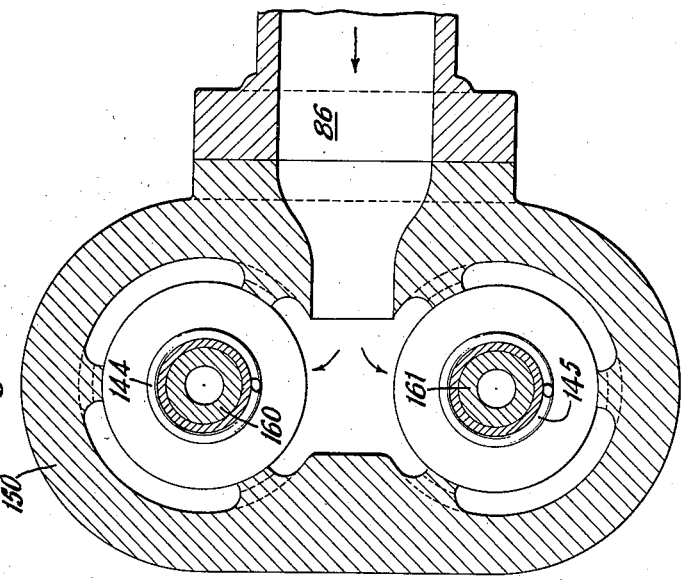
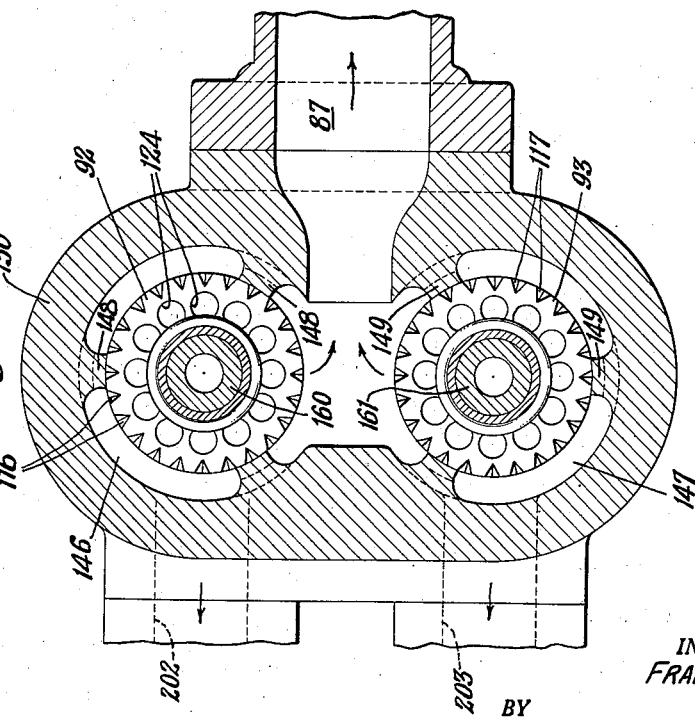
INVENTOR.
FRANK BERRY
BY
Pollard, Johnston, Smythe & Robertson
ATTORNEYS

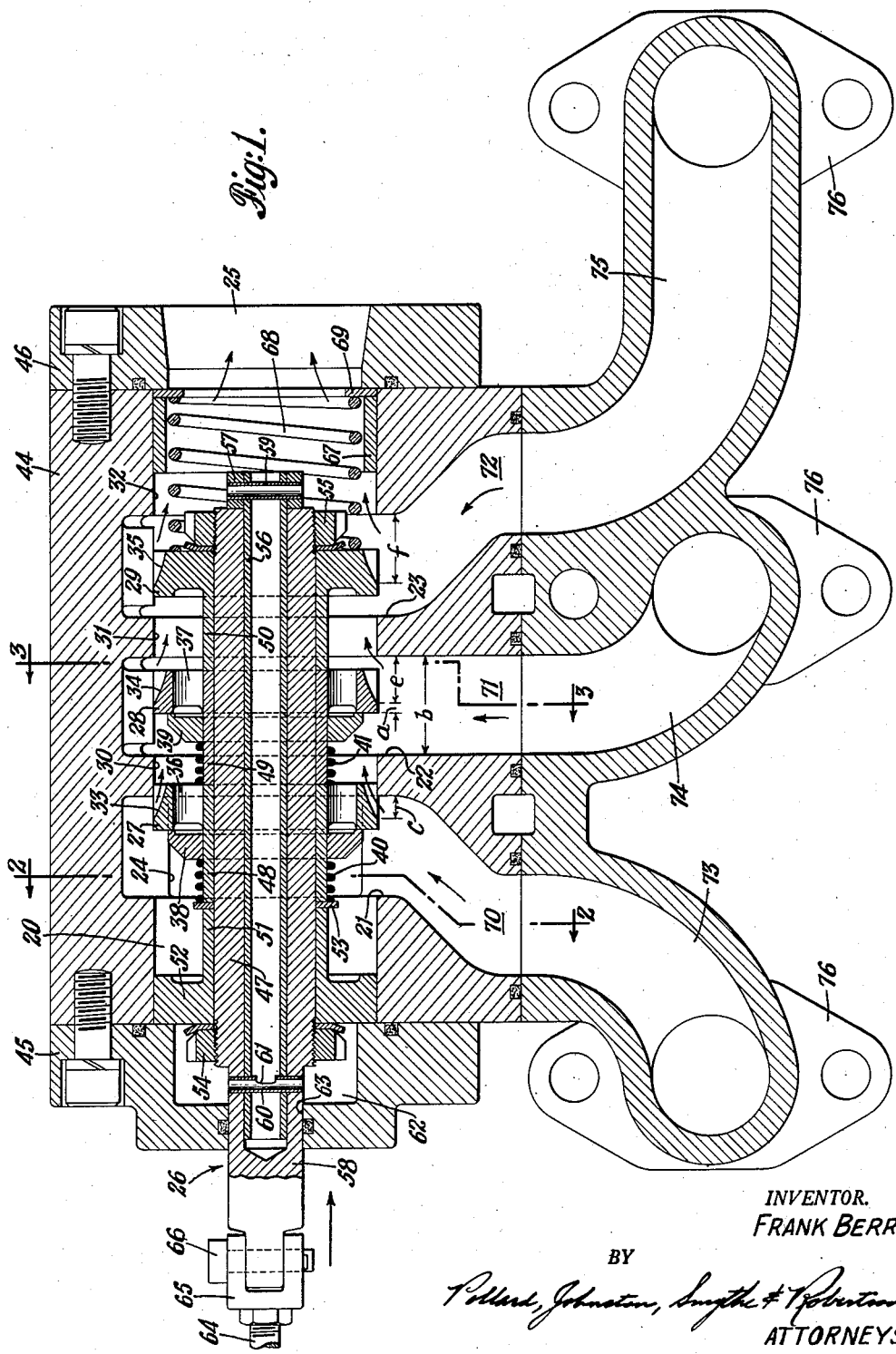

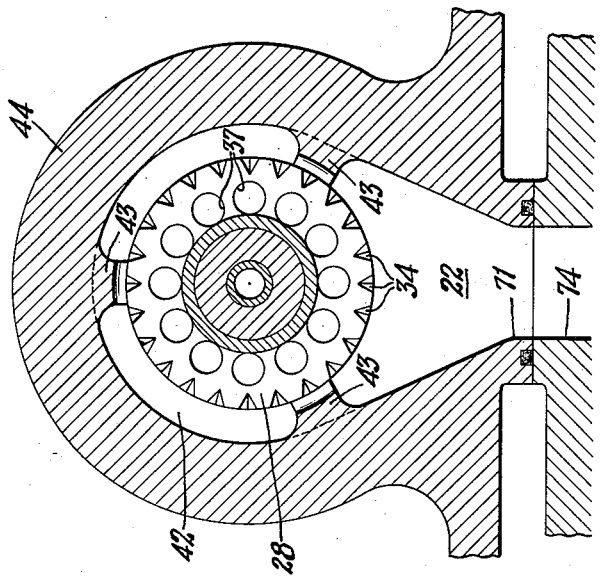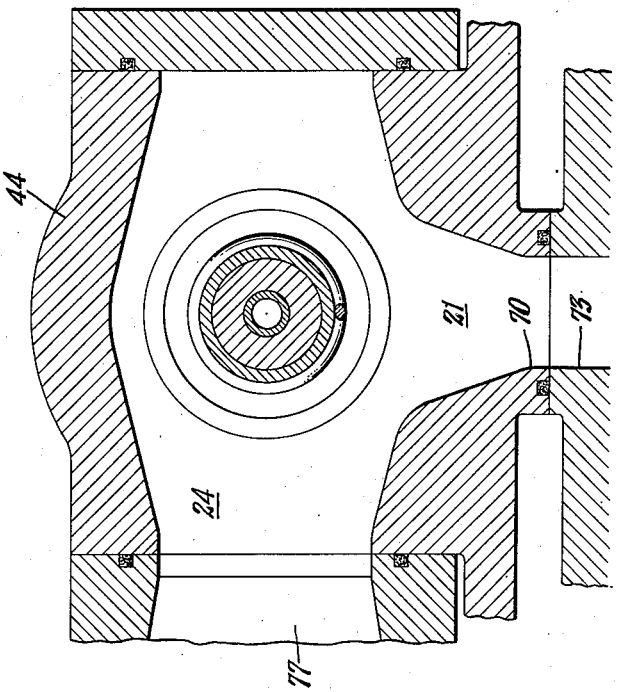

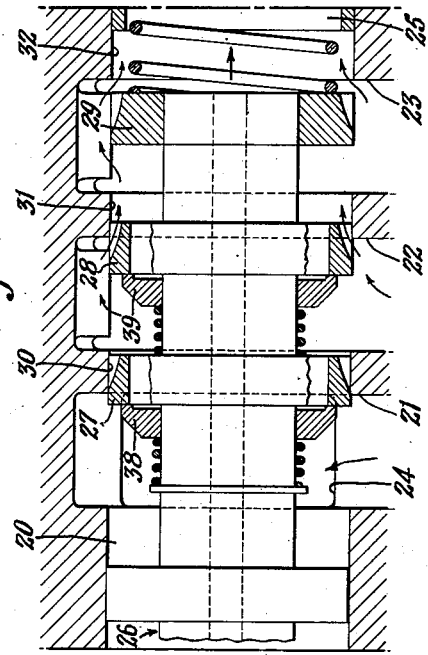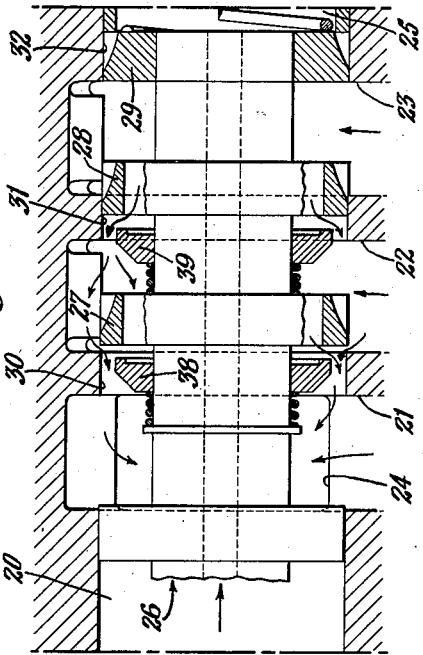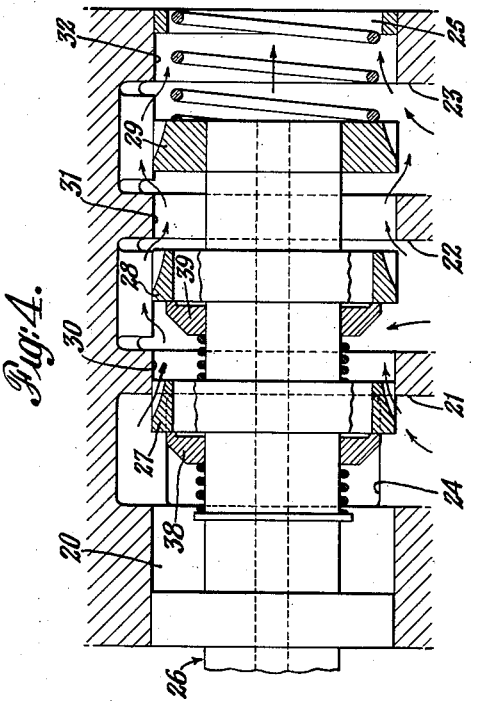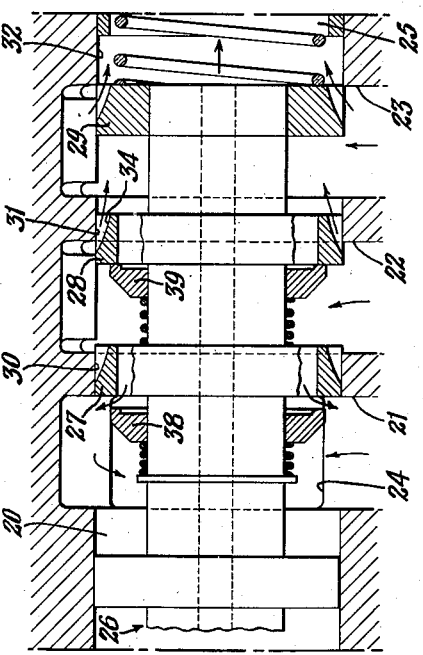

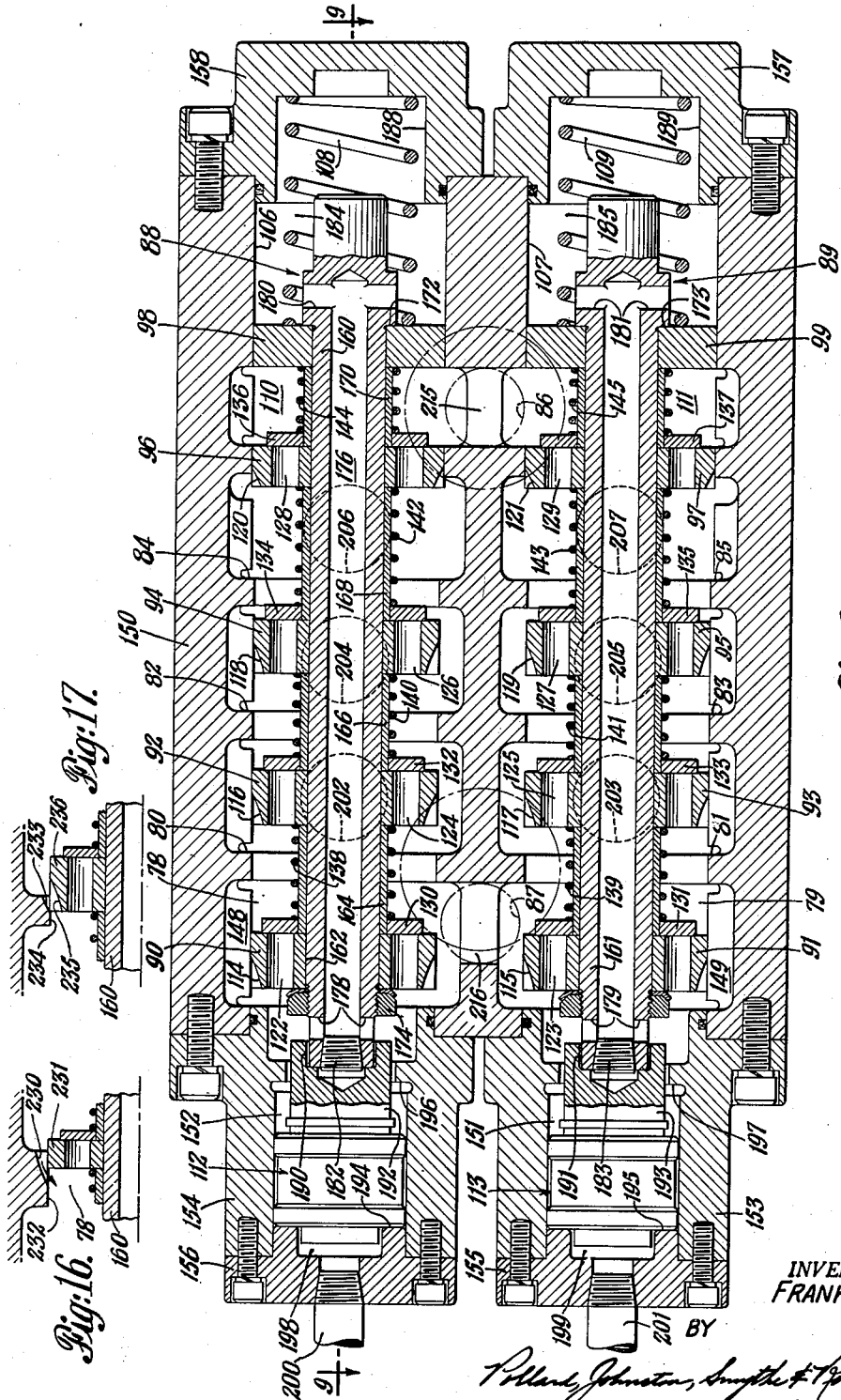

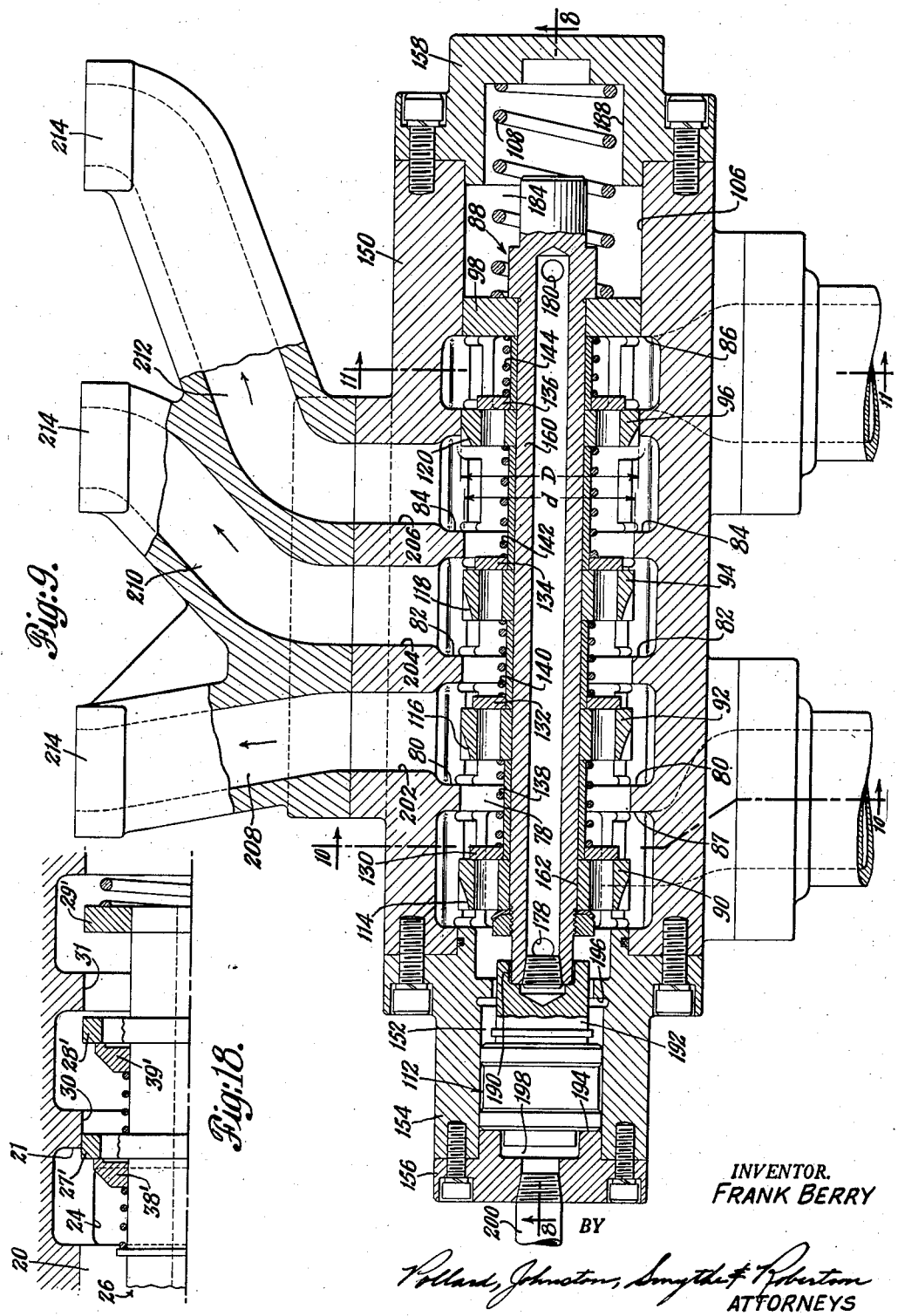

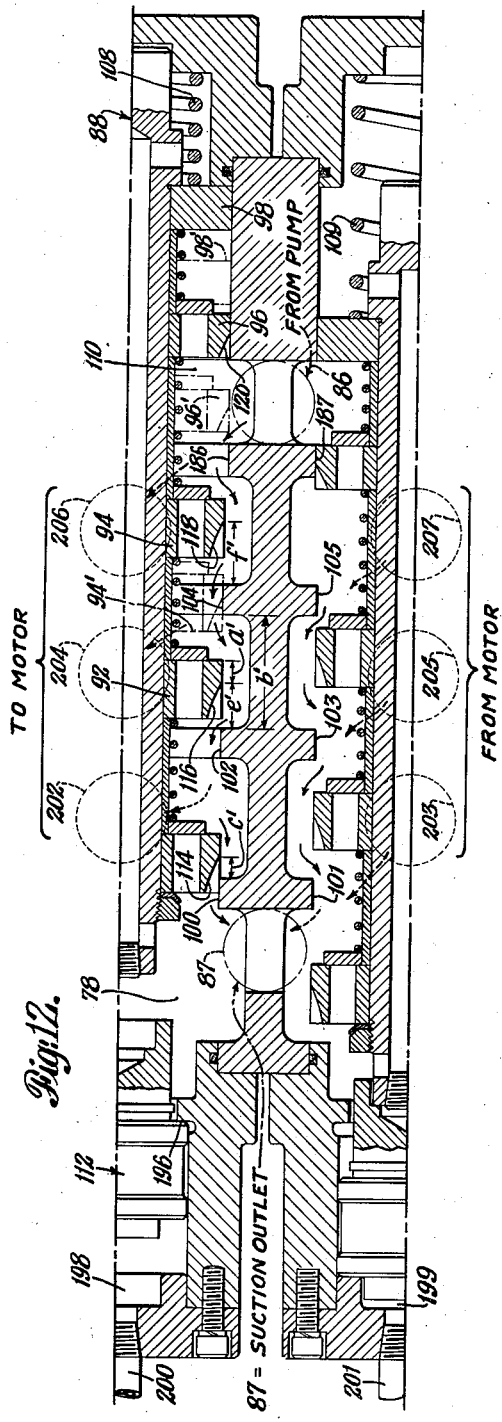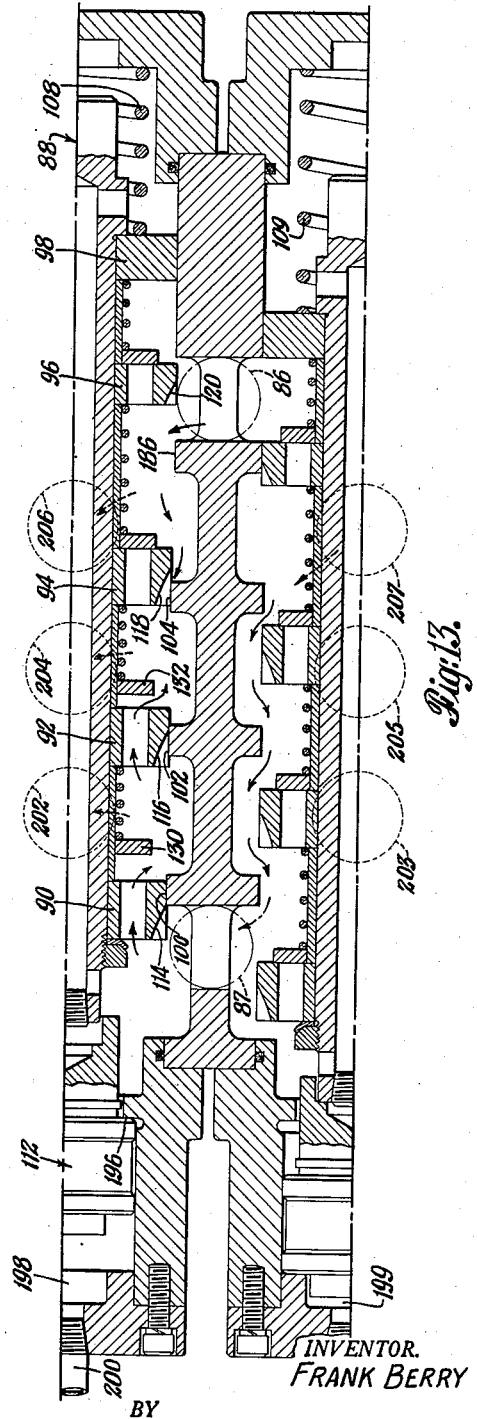

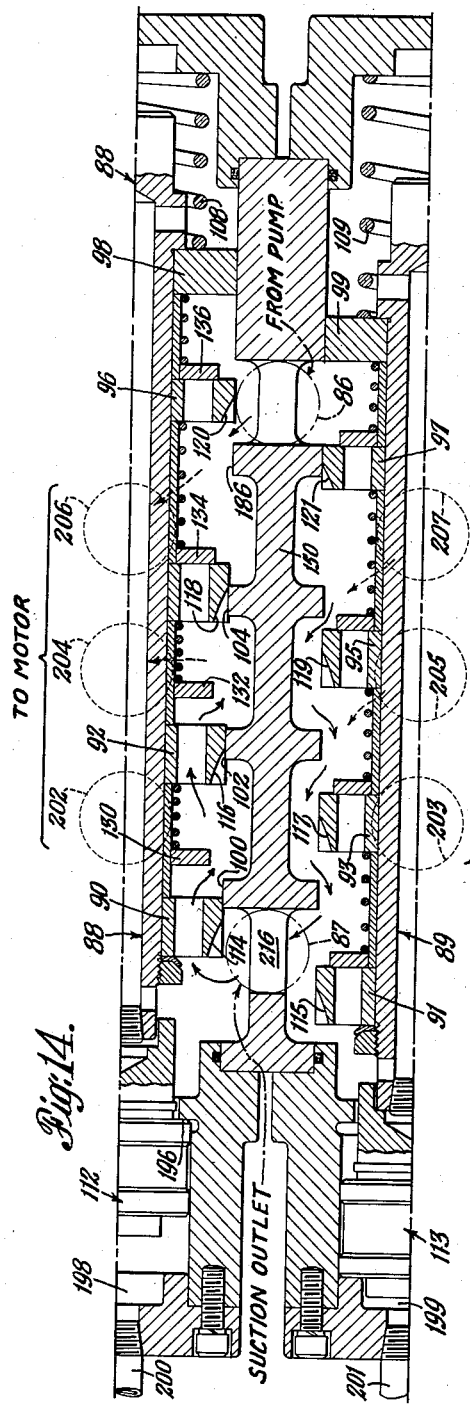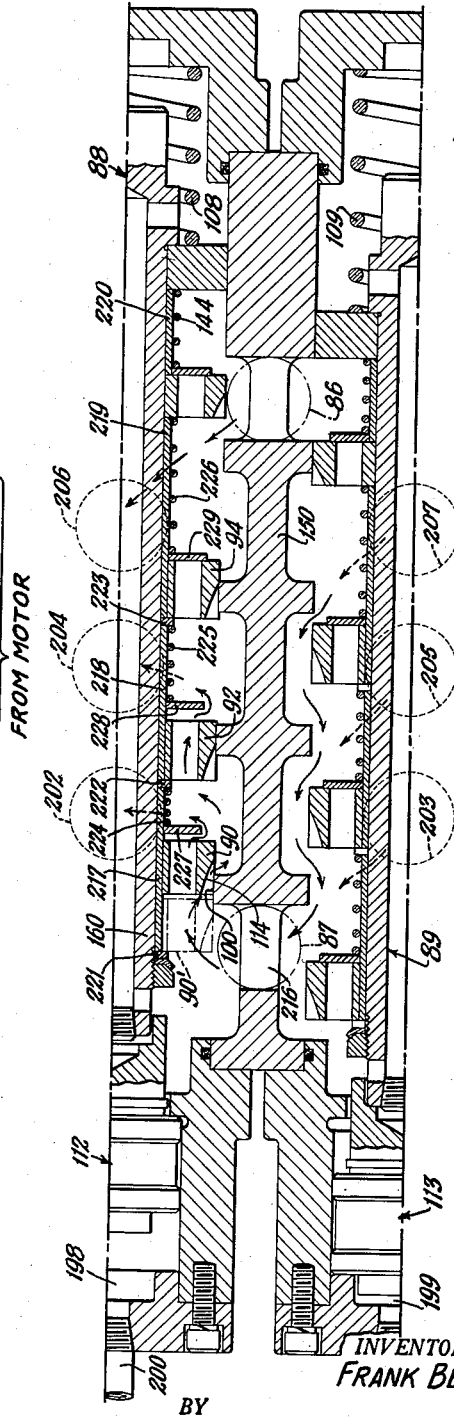

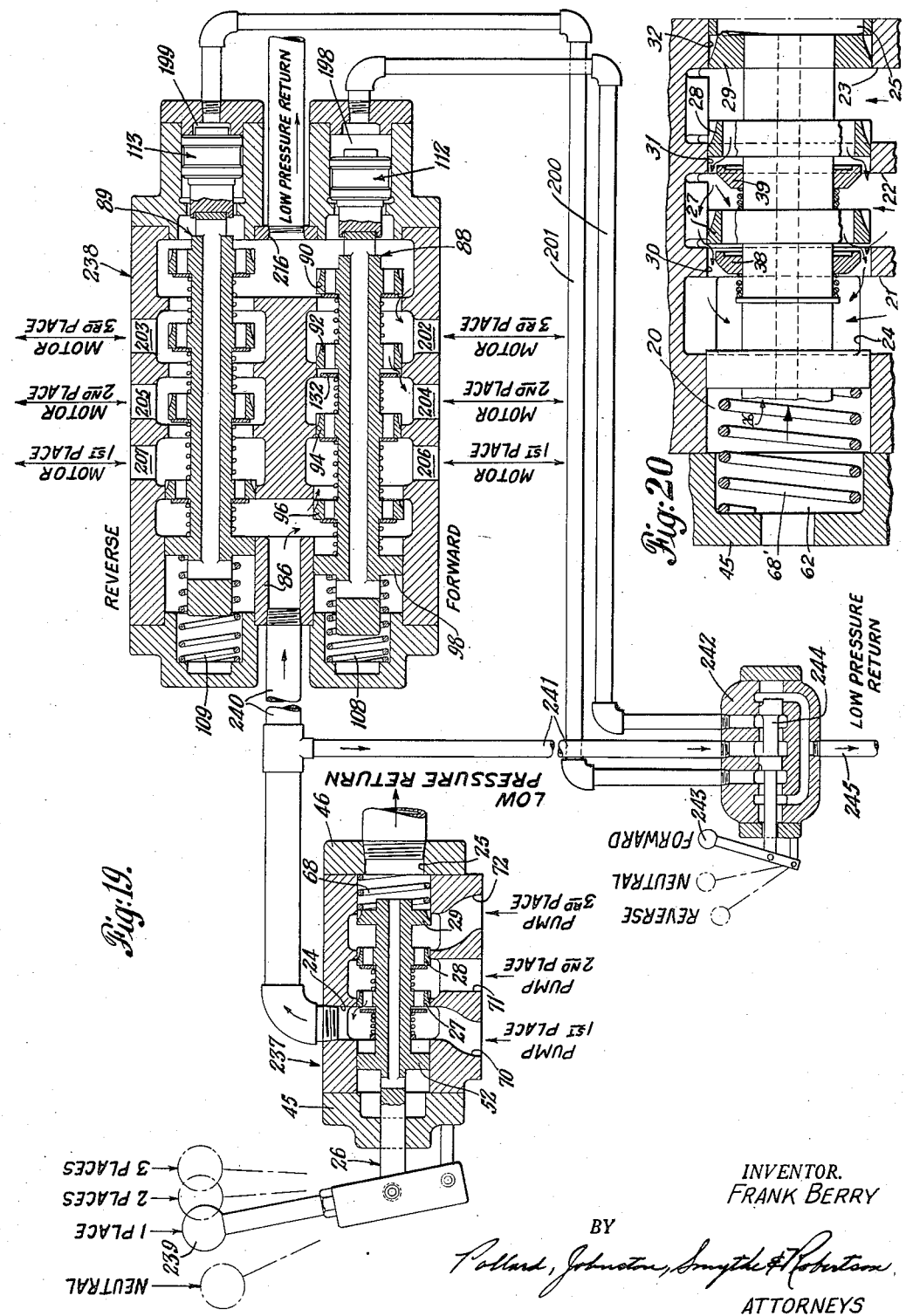

United States Patent Office 2,833,308
Patented May 6, 1958

2,833,308

MULTIPLE CONTROL VALVE FOR FLUID PUMPS, MOTORS, AND TRANSMISSIONS

Frank Berry, Corinth, Miss., assignor, by mesne assignments, to Oliver Tyrone Corporation, Pittsburgh, Pa., a corporation of Pennsylvania Application June 2, 1955, Serial No. 512,776

14 Claims. (Cl. 137—622)

The invention relates to valves for controlling the operation of fluid pumps, motors and transmissions. It is applicable to controlling the output of a multiple place pump, the operation of a multiple place motor, and to the control of fluid transmissions including torque converters involving single place pumps driving multiple place motors, multiple place pumps driving single place motors, and multiple place pumps driving multiple place motors.

That is to say, the invention is applicable to fluid power units generally, to control the action of multiple operating places (such as two or more rotary power annular cylinder and piston combinations connected together for operation in parallel) for the purpose of varying torque through valving of the several places successively into or out of the power cycle. Further, the invention is applicable to control of such operations either manually, automatically or semi-automatically.

One of the more serious problems heretofore existing in the construction of valves for the purposes stated has been that of devising some means to produce a smooth, continuous flow of fluid without the sudden impulse or jerk experienced in valving the several operating places successively into or out of the power cycle. To take a familiar example, in certain types of hydraulic transmissions for automobiles the automatic shifting can be sensed by the driver as the torque ratio changes step by step. In other types of such automatic transmissions, this effect is eliminated only through the use of impositive torque converters in which the fluid is constantly in motion at high velocities, and in which an appreciable amount of slippage occurs between the mechanical parts of the drive due to the fact that there is no positive hydraulic lock between them, with consequent loss in efficiency. Accordingly, it has been an object of my invention to provide a multiple control valve which, within itself, will produce a smoother, more continuous flow of fluid during "shifting," i. e. during the operation of valving in, or out, the several places of a fluid power device.

My invention also finds special application to hydraulic transmissions of the type disclosed in my prior Patent No. 2,697,912. When so employed, the smoothness of the transition from place to place of the hydraulic motor is further improved, aiding the transmission of power through what is virtually an infinitely variable range of torque ratios in a closed positive hydraulic system of extremely high efficiency.

Summary

My invention comprises in its general arrangement a multiple control valve for pumps, motors and transmissions, comprising a cylinder, two or more ports spaced along such cylinder for communication with the several places of a multiple place fluid power device, a high pressure duct at one end of the cylinder for communication with another fluid power device, and a low pressure outlet or return line at the other end of the cylinder, a valve element movable lengthwise within the cylinder, and piston-like spools on this valve element. The spools have a sliding engagement with the cylinder, and each spool has a peripheral sealing surface which is shorter than the longitudinal dimension of an adjacent port to provide a fluid passageway around the outside of the spool whenever the spool lies between the ends of its adjacent port. Each spool is movable to a position to block the passageway around it by closing with the cylinder walls at the land beyond its adjacent port. The spools are so spaced relative to one another and in relation to the ports that when two successive spools lie opposite their respective ports the peripheral sealing surface of one spool is nearer land than is that of the other spool.

One or more of the spools preferably includes a tapered section, or a series of peripherally arranged tapered channels, so that as such spool closes with the walls of the cylinder at the land beyond the port, the fluid passageway around the outside of the spool is gradually diminished in size. As a result, the valving action of successive spools is overlapped to produce exceptionally smooth continuous flow control. What happens is that one spool will partially close its passageway before another spool has completely closed its respective passageway. This in turn permits partial operation of two or more places of the connected fluid power device, creating pressures intermediate the stages represented by the several places of such device. The final result is to produce an almost infinite range of pressures and to blend the action of the several places as they are brought into, or taken out of, the work cycle, so that the tendency to create sudden impulse surges, or step by step pulsations, is so far minimized as to be practically unnoticeable. Apparently it is possible to achieve what may for all practical purposes be described as infinitely variable torque ratios rather than just that number of torque ratios which would be represented by the number of places in the associated fluid power device. Thus is eliminated the need for sacrificing power and efficiency through the usual expedient of employing impositive torque converters such as turbining rotors or other means that smooth out the torque curve only by slippage with consequent decrease in overall efficiency of the power transmission.

According to my invention in its preferred form as applied to automatic torque control with selective forward and reverse operation, a pair of multiple place valves such as I have described are employed together in an arrangement wherein the valve elements are spring-biased and actuated differentially by input pressure operating against piston spools of different effective areas. Fluid piston means adjacent the low pressure end of each of the pair of valve cylinders are arranged for selective operation to move either of the valve elements into a position in which high pressure fluid is admitted between the piston spools of different effective areas to further move the selected valve element against the action of its biasing spring for automatic control of the position of such valve element in accordance with torque requirements.

Other features and advantages of my invention will appear as the description proceeds.

Description

Figs. 1–7 of the annexed drawings illustrate the best mode contemplated by me for carrying out my invention as applied to a valve for manual actuation to control the transmission of fluid from a multiple place fluid pump to either a single or multiple place fluid motor.

Fig. 1 is a central longitudinal sectional view (the section may be regarded as either vertical or horizontal depending on the desired position of the valve for a particular installation) showing a valve for a three place hydraulic pump. The valve element and control spools are here in a position for by-passing fluid back to the pump without actuating the motor.

Fig. 2 is a transverse sectional view taken as indicated at 2—2 in Fig. 1 and showing the inlet from one of the places of the pump and the outlet to the motor.

Fig. 3 is a transverse sectional view taken on the line 3—3 of Fig. 1.

Figs. 4 to 7, inclusive, are diagrammatic sectional views showing various positions of the valve element and control spools, as follows:

Fig. 4: idling, or by-passing position (corresponds to Fig. 1).

Fig. 5: one pump place delivering full output to motor; two pump places by-passing (high torque ratio).

Fig. 6: one pump place delivering full output to motor; second pump place delivering partial output to motor, by-passing the remainder; third pump place by-passing (intermediate torque ratio).

Fig. 7: all three pump places delivering full output to motor (low torque ratio, or, popularly, "high gear").

Figs. 8–14 illustrate the best mode contemplated by me for carrying out my invention as applied to automatic torque control with selective forward and reverse operation of a multiple place motor driven by either a single or multiple place pump.

Fig. 8 is a central longitudinal sectional view (the section may be regarded as either vertical or horizontal depending on the desired position of the valve for a particular installation) showing a valve for a three place hydraulic motor. The valve elements and control spools are here in a neutral position, as when no fluid is being delivered by the pump and the motor is not being driven.

Fig. 9 is a longitudinal sectional view (partly in plan or elevation as the case may be) taken as indicated at 9—9 in Fig. 8.

Fig. 10 is a transverse sectional view taken on the line 10—10 of Fig. 9.

Fig. 11 is a transverse sectional view taken on the line 11—11 of Fig. 9.

Figs. 12 to 14 inclusive are detail sectional views similar to Fig. 8 but showing only the central portion of the valve (i. e. that portion which lies between the center lines of the two valve elements), illustrating various positions of the valve element which controls flow to the motor to drive it forwardly, as follows:

Fig. 12: pump delivering output to all three places of motor (high torque ratio or "low gear"—all three motor places receiving full flow of fluid and thus "fully in").

Fig. 13: one motor place fully in, second motor place partly in, and third motor place by-passing (intermediate torque or "second gear").

Fig. 14: one motor place fully in and the other two places by-passing (low torque ratio or "high gear").

Fig. 15 is a detail sectional view similar to Figs. 12–14, illustrating a modified form of this valve in which at least one of the control spools is mounted to slide along its associated valve element. The valve element is shown in a position such that one motor place is fully in and the other two motor places are by-passing, and in which the sliding spool has floated over to the right so as to permit increased flow into the two motor places that are by-passing.

Fig. 16 is a detail sectional view of one of the spools with adjacent valve structure, illustrating a modified form of my valve in which the tapered channels are formed in the walls of the cylinder instead of in the periphery of the spool.

Fig. 17 is a view similar to Fig. 16, illustrating a further modification in which tapered channels are present in both the cylinder walls and the contiguous surfaces of the spool.

Fig. 18 is a diagrammatic view similar to Fig. 5 illustrating a modification in which the tapered channels are omitted altogether.

Fig. 19 is a diagram illustrating a pump valve and a motor valve arranged in combination for manual control of the output of a multiple-place pump and automatic control of the input to a multiple-place motor.

Fig. 20 shows a modified form of the valve means and shows the valve element in the same position as in Fig. 7.

*Pump valve*

Referring to Figs. 1 to 3 inclusive, I shall now describe a preferred form of my valve as applied to controlling the transmission of fluid from a multiple place fluid pump to either a single or multiple place fluid motor. The valve in its general arrangement comprises a cylinder 20, three ports 21, 22 and 23 spaced longitudinally along the cylinder for communication with the respective places of a multiple place fluid pump, a high pressure duct 24 adjacent one end of the cylinder for communication with a fluid motor, and a low pressure outlet 25 adjacent the other end of the cylinder, a valve element 26 movable lengthwise within cylinder 20, and spools 27, 28 and 29 on valve element 26, these spools having a sliding engagement with the cylinder, and each of the spools having a peripheral sealing surface $a$ which is shorter than the longitudinal dimension $b$ of an adjacent one of said ports, to provide a fluid passageway around the outside of the spool whenever the spool lies between the ends of its adjacent port. (When valve element 26 is in the position shown in Fig. 1, all three spools lie between the ends of their adjacent ports and there is a fluid passageway around the outside of each of the spools.) Each of the spools 27, 28 and 29 is movable with valve element 26 into a position to block its respective passageway by closing with the walls of cylinder 20 at the lands 30, 31 and 32 beyond the respective ports, and the spools are so spaced relative to one another and the respective lands that when two successive spools lie opposite their respective ports, the peripheral sealing surface of one spool is nearer land than is that of the other spool. Thus, the peripheral sealing surface of spool 27 is nearer to the land 30 than is the peripheral surface of spool 28 to the land 31. In Fig. 1 the respective distances between the peripheral sealing surfaces and the lands are indicated at $c$ and $e$, $c$ being a shorter distance than $e$. Similarly the peripheral sealing surface of spool 28 is nearer the land 31 than is the peripheral surface of spool 29 to the land 32, the respective distances being indicated at $e$ and $f$, $e$ being a shorter distance than $f$. Thus:

$$c < e < f$$

Contiguous surfaces of the cylinder 20 and at least one of the spools 27, 28, 29 include a tapered section so that as such spool closes with the walls of the cylinder at the land beyond the port, the fluid passageway around the outside of the spool is gradually diminished in size so that the valving action of successive spools is overlapped to produce smooth continuous flow control. In the embodiment of Figs. 1–3, such tapered sections are provided in each of the spools referred to, and each such tapered section consists of a series of peripherally arranged tapered channels 33, 34 and 35 respectively (see especially Fig. 3). The provision of such tapered sections permits spool 28 to partially close its passageway before spool 27 has completely closed its respective passageway. In this manner the action of closing the passageways around the several spools is blended and the aforesaid "overlapping" action of the spools is realized.

As seen in Fig. 1, spools 27 and 28 include an opening, or a series of openings, 36, 37, extending therethrough, such openings being closed under certain conditions of operation by spring-pressed members 38, 39, the edges of which are urged toward sealing engagement with the respective spools, as by means of coil springs 40, 41.

The passageways around the spools preferably are of generally annular form as may be seen at 42 in Fig. 3, and a series of projections such as 43, meet the peripheries of the respective spools to guide them during their movement longitudinally of the cylinder into and out of sealing engagement with the respective lands. What the projections 43 do in effect is to provide guide rails bridging the annular passageways between the several lands.

I have described above the essential elements of the pump valve of Figs. 1-3, and the mechanical details of the construction will be further apparent from the drawings themselves. For completeness of description, several of these details will here be noted. Cylinder 20 is formed in a metal valve block 44 having end plates 45, 46 secured thereto, as by means of cap screws. Valve element 26 may comprise a stem 47 extending through sleeves 48, 49 and 50 which carry the spools 27, 28 and 29, and also extending through sleeve 51 of a piston 52 which has a sliding engagement with the left-hand end of cylinder 20. An annular ring 53, held between sleeves 48 and 51, furnishes a stop for one end of coil spring 40. Sleeves 48 to 51 inclusive, and annular ring 53, are suitably affixed to valve stem 47 as by means of nut and lock washer assemblies 54, 55 at the ends of the stem. A sleeve 56 extends through an opening in the center of stem 47, projecting beyond the ends thereof to receive at the right-hand end a collar 57, and at the other end to be received in an opening in an extension 58 of the valve stem. Collar 57 is suitably secured to sleeve 56 as by means of a hollow pin 59, and extension 58 is secured to the sleeve by means of a similar hollow pin 60 in which is formed an opening 61 in communication with the bore of sleeve 56. This arrangement is for the purpose of permitting fluid to flow to and from the space 62 beyond the end of piston 52 via the hollow pin 60 and the bore of sleeve 56 to and from the low pressure end of the unit during the movements of the valve element 26, thus preventing a fluid lock at the left of piston 52. Valve stem extension 58 passes through a sealed opening 63 in end plate 45 for connection to a suitable manual control rod 64 as by means of clevis 65 and pin 66. At the right-hand end of the cylinder block a sleeve 67 is fitted into the end of the cylinder and may receive a coil spring 68 bearing at one end against spool 35 and at the other end against a ring 69 held in place by end plate 46. The function of spring 68 is to hold the valve element 26 normally in the position shown in Fig. 1 wherein fluid from a three place pump is by-passed. Operation of the manual control 64 compresses spring 68 to bring one or more places of the pump into the operating cycle as may be desired.

For some applications of the valve it may be desired that the valve element 26 be biased normally to the right into the position for discharging the full capacity of all three pump places into the high pressure duct 24 leading to the fluid motor. In this case the spring 68 may be replaced by a similar spring located in the space 62 within end plate 45, and the several places of the fluid pump would be manually cut out of the operating cycle by pulling the valve element 26 to the left against the action of such spring. Thus the valve element may be spring-biased into fully opened position or fully closed position as desired.

Valve ports 21, 22 and 23 of cylinder 20 communicate with passages 70, 71 and 72 in valve block 44. These passages in turn communicate with suitable conduits 73, 74 and 75 leading to the respective discharge outlets of the several places of the fluid pump to which the valve may be attached by means of suitable flanges 76.

High pressure duct 24 communicates with a conduit 77 (Fig. 2) leading to the inlet of a fluid motor or to any device to which the operating fluid is to be delivered.

Low pressure outlet 25 may be connected to a reservoir or to the intake side of the pump which is controlled by the valve.

*Operation of pump valve*

Operation of the pump valve will now be further explained with reference to the diagrammatic positional views in Figs. 4 to 7 inclusive.

In Fig. 4 the valve element 26 is shown in the idling position which has already been described with reference to Fig. 1, q. v. It is considered that the valve is connected in the manner previously described to a three place fluid pump which delivers fluid to valve cylinder 20 through the ports 21, 22 and 23. With the valve element 26 and its associated spools in the position here shown, fluid entering through port 23 flows directly into the low pressure outlet 25 to be by-passed to the reservoir or to the suction intake of the pump. Fluid entering the valve cylinder through port 22 flows around spool 28 and thence through the fluid passageway around the outside of spool 29 and into low pressure outlet 25. Similarly, fluid entering the cylinder through port 21 flows around spool 27 and thence, in turn, through the fluid passageways around the outside of spools 28 and 29 and into low pressure outlet 25. Thus, with the three spools 27, 28 and 29 in the positions shown wherein they lie between the ends of their adjacent ports, the annual passageways around the outside of the spools are all open (see 42, Fig. 3) with the result that the fluid discharged from all places of the pump flows freely into the low pressure outlet, by-passing the high pressure outlet 24.

In Fig. 5 the valve element 26 has been moved to the right by manual adjustment of control rod 64 or of a suitably actuated lever therefor. The extent of movement of the valve element 26 is such as to bring the peripheral sealing surface of spool 27 into position to block the passageway around the spool by closing with the walls of cylinder 20 at the land 30 beyond port 21. This causes the full output from one place of the pump to pass from port 21 directly into the high pressure outlet 24 for operation of the motor at low speed. The fluid from the other two places of the pump continues to be by-passed to the low pressure outlet 25 in the manner already described.

In Fig. 6, valve element 26 has been moved farther to the right and to an extent such that spool 28 partially blocks the passageway around it, restricting the flow to an amount represented by the small streams of fluid passing through the narrow ends of the tapered channels 34 in the periphery of the spool. Under this condition of restricted flow around spool 28, a portion of the fluid entering the valve through port 22 is diverted, building up a pressure sufficient to move the spring-pressed member 38 to the left so that some of the fluid passes into the high pressure outlet 24 along with the fluid from port 21. Under this condition we have one of the pump places delivering its full capacity to the motor, and the second place of the pump delivering part of its capacity to the motor. The entire capacity of the third place of the pump continues to be by-passed as before. To summarize this in common parlance, we would say that one motor place is "fully in," the second motor place is "partly in," and the third motor place is "by-passing."

It may be observed at this point that during the movement of valve element 26 between the positions shown in Figs. 4 and 5, two things occur: first, the spool 27 gradually closes or "pinches off" the flow through the passageway around it, and second, spool 28 gradually closes or pinches off the passageway around it. During a portion of this movement, spool 27 reaches its final blocking position while at the same time spool 28 is just beginning to pinch off its surrounding passageway. Thus the actions of the spools 27 and 28 are so correlated as to have an overlapping action for closing their respective passageways. In terms of the result produced, this means that the delivery of fluid from the first pump place to the motor is gradually increased from zero to full capacity (speaking with regard to a given speed of operation of the pump), and that during the time that this full capacity is approached, pressure begins to build up at the second place of the pump preparatory to initiating discharge from the second place to the motor.

At just about the instant that the first pump place begins to discharge its full capacity to the motor, the pressure developed at the second place due to the partial closing of the passageway around spool 28, starts to open the spring-pressed member 38 so that we have a gradual increase in flow and a smooth transition from one operating pump place to another at all times during movement of the valve element 26.

During the movement of the valve element 26 between the position shown in Fig. 5 and that shown in Fig. 6, there is a gradual increase in delivery from the second place of the pump to the motor from zero, and as the valve element moves farther to the right so that the sealing surface of spool 28 completely blocks its surrounding passageway by closing with the walls of the valve cylinder at the land 31, we reach a condition in which the second place is discharging its full capacity to the motor. The motor is now driven from two places of the pump and we have two pump places "fully in" and the third pump place "by-passing."

Fig. 7 shows the result of a further increment of movement of valve element 26 to the right. What happens between the positions shown in Figs. 6 and 7 is that spool 29 gradually pinches off flow from the third motor place through port 23 to the low pressure outlet 25. During the first part of this movement, discharge from the second pump place reaches full capacity and during the latter part of this movement the flow from the third pump place reaches its full capacity. Finally, in the position shown in Fig. 7, pressure of the fluid from the third pump place has moved spring-pressed member 39 to the left to permit the full capacity of the third pump place to be delivered through the openings in spool 28 and to join with the fluid discharged from the second place of the pump, and to flow on through the openings in spool 27 (or partly around the latter spool). Now all three places of the pump are "fully in" and delivering their entire capacities to the motor.

When the manual control for valve element 26 is released, the coil spring 68 returns it to its initial by-passing position of Fig. 4. During the return movement the action of the spools is simply reversed from that which has been described so that there is a smooth continuous reduction in the amount of fluid delivered from the pump to the motor.

When the valve is constructed in accordance with my invention, not only will it produce a smoother, more continuous, flow of fluid during the operation of valving in or out the several places of a fluid power device, but such valve is more compact in construction. This is due at least in part to the fact that the action of individual spools for the several places overlaps, greatly reducing the required extent of movement of the valve element.

Motor valve

Referring now to Figs. 8 to 11 inclusive, I shall describe a preferred embodiment of my invention as applied to automatic torque control with selective forward and reverse operation of a multiple place motor by either a single or multiple place pump. The valve here shown comprises in its general arrangement a pair of cylinders 78, 79, cylinder 78 having three ports 80, 82 and 84, and cylinder 79 having three ports 81, 83 and 85 spaced longitudinally thereof for communication with the inlets and outlets of the respective places of a multiple place fluid motor. The ports 80, 82 and 84 are arranged for communication with one side of the motor to drive the motor forwardly, and the ports 81, 83 and 85 are arranged for communication with the other side of the motor to drive the motor reversely. A high pressure duct 86 is connected adjacent one end of the cylinders for communication with the high pressure output side of a fluid pump, and a low pressure outlet 87 is connected near the other end of the cylinders for communication with a reservoir or suction side of the pump. Valve elements 88, 89 are movable lengthwise in the respective cylinders. Mounted on valve element 88 is a series of spools 90, 92, 94, 96, 98, and mounted on valve element 89 is a similar series of spools 91, 93, 95, 97, 99. Referring to Fig. 12, each of the spools 90, 92 and 94 has a peripheral sealing surface $a'$ which is shorter than the longitudinal dimension $b'$ of an adjacent one of said ports, to provide a fluid passageway around the outside of the spool whenever the spool lies between the ends of its adjacent port. (When valve element 88 is in the position shown in Fig. 12, all three spools lie between the ends of their adjacent ports, and there is a fluid passageway around the outside of each of the spools.) Each of the spools 90, 92 and 94 is movable with valve element 88 into a position to block its respective passageway by closing with the walls of cylinder 78 at the lands 100, 102 and 104 beyond the respective ports 202, 204 and 206, and the spools are so spaced relative to one another and the respective lands that when two successive spools lie opposite their respective ports, the peripheral sealing surface of one spool is nearer land than is that of the other spool. Thus the peripheral sealing surface of spool 90 is nearer to the land 100 than is the peripheral surface of spool 92 to the land 102. In Fig. 12 the respective distances between the peripheral sealing surfaces and the lands are indicated at $c'$ and $e'$, $c'$ being a shorter distance than $e'$. Similarly the peripheral sealing surface of spool 92 is nearer the land 102 than is the peripheral surface of spool 94 to the land 104, the respective distances being indicated at $e'$ and $f'$, $e'$ being a shorter distance than $f'$. Thus:

$$c' < e' < f'$$

The pair of spools 96, 98, and 97, 99 adjacent the high pressure end of the cylinders have a greater effective area than that of any of the spools 90, 92, 94, and 91, 93, 95, these spools having sliding engagement in the widened bore 106, 107 at the right-hand end or high pressure end of the respective cylinders 78, 79. The difference between the diameters of the different sections of the cylinder bore is indicated in Fig. 9 where the diameter of the bore for spools 96, 98 is indicated at D and the smaller diameter of the bore for the spools 90, 92 and 94 is indicated at $d$. Springs 108, 109 serve to bias the respective valve elements 88 and 89 toward the low pressure end of the cylinders to a position in which the high pressure duct 86 communicates with the spaces 110, 111 between the spools of the respective pairs 96, 98 and 97, 99. Fluid piston means, indicated generally at 112, 113, adjacent the low pressure end of each cylinder, are arranged for selective operation to move either of the valve elements 88 or 89 toward the high pressure end of its respective cylinder to a position in which high pressure fluid entering through duct 86, flows beyond the respective pair of spools to further move the selected valve element (88 or 89 as the case may be) against the action of its biasing spring for automatic control of the position of such valve element in accordance with torque requirements.

With particular reference to Fig. 8, it will be observed that in the embodiment being described, cylinder 79 is a duplicate of cylinder 78, valve element 89 a duplicate of valve element 88, and that similarly the arrangement of the several spools and pistons for the two sections of the valve is the same for each section. Therefore it will suffice for the balance of the description of this form of valve, to refer in detail to just one section of the valve, it being understood that the other section preferably is of identical construction.

Contiguous surfaces of the cylinder 78 and at least one of the spools 90, 92, 94 include a tapered section so that, as such spool closes with the walls of the cylinder at the land beyond the port, the fluid passageway around the outside of the spool is gradually diminished in size so that the valve action of successive spools is overlapped to produce smooth, continuous flow control. In the embodiment of Figs. 8–11, such tapered sections are provided in each of the spools referred to, and also in the spool 96, and each such tapered section consists of a series of peripherally arranged tapered channels—114, 116, 118 and 120 respectively. (The intervening and successive odd numbered references 115, 117, 119 and 121 are applied to the corresponding elements of the other section of the valve.) The provision of such tapered sections permits spool 92 to partially close its passageway before spool 90 has completely closed its respective passageway. In this manner the action of closing the passageways around the several spools is blended and the aforesaid "overlapping" action of the spools is realized.

Spools 90, 92, 94 and 96 include an opening, or a series of openings, 122, 124, 126 and 128 respectively, extending therethrough, such openings being closed under certain conditions of operation by spring-pressed members 130, 132, 134 and 136, the edges of which are urged toward sealing engagement with the respective spools, as by means of coil springs 138, 140, 142 and 144.

The passageways around the spools preferably are of generally annular form as may be seen at 146 in Fig. 10, and a series of projections such as 148, meet the peripheries of the respective spools to guide them during their movement longitudinally of the cylinder into and out of sealing engagement with the respective lands. Thus, as in the previous embodiment, projections 148 in effect provide guide rails bridging the annular passageways between the several lands.

I have described above the essential elements of the motor valves of Figs. 8–11, and the mechanical details of the construction will be further apparent from the drawings themselves. For completeness of description several of these details will here be noted. Cylinders 78 and 79 are formed in a metal valve block 150, and the auxiliary cylinders 151, 152 for control pistons 112, 113 are formed in extensions 153, 154 suitably held in tight sealing engagement with block 150. End plates or cylinder heads 155, 156, 157 and 158, secured to the cylinder block and cylinder block extensions as by means of cap screws, complete the valve housing.

Valve element 88 (and, similarly, valve element 89) may comprise a stem 160 extending through central openings 162 etc. in the spools 90 to 98 inclusive, and through spacer sleeves 164, 166, 168 and 170 arranged between the spools to space them apart the requisite distances. The sleeves and the spools are suitably affixed to valve stem 160 as by means of a shoulder 172 near one end of the stem, and a nut and lock washer assembly 174 at the other end. Valve stem 160 has a longitudinal bore 176 communicating with transverse bores 178 and 180. The end of bore 176 is closed as by means of a threaded pipe plug 182. This arrangement is for the purpose of permitting fluid to flow to and from the space 184 beyond the end of spool 98 via the bores 180, 176 and 178 to and from the low pressure end of the unit during the movements of the valve element 88, thus preventing a fluid lock at the right of spool 98. The coil spring 108 previously referred to is arranged in the space 184 and around the right-hand end of valve stem 160, and extends into a recess 188 in cylinder head 158. This spring bears at one end against spool 98 and at the other end against the cylinder head, and biases valve element 88 to the left so that, under non-driving conditions, as when the motor controlled by the valve is stopped or idling, the valve assembly occupies the position shown in Figs. 8 and 9. In this position the left-hand end of valve stem 160 is seated in a recess 190 in stem 192 of piston means 112, with the piston at the left-hand end of its stroke as determined by its bearing against a shoulder 194 of cylinder head 156. The extent of movement of the piston to the right is determined by its bearing against a shoulder 196 of the extension 154 of the valve block. A recess 198 in the cylinder head communicates with a fluid conduit 200 leading to a suitable control valve and source of fluid pressure for actuating the control piston 112.

Valve ports 80, 82 and 84 of cylinder 78 communicate with passages 202, 204 and 206 (Fig. 9). These passages in turn communicate with suitable conduits 208, 210 and 212 leading to the respective high pressure inlets of the several places of the fluid motor to which the valve may be attached by means of suitable flanges 214. High pressure duct 86 leads to the outlet of a fluid pump. Low pressure outlet 87 may be connected to a reservoir or to the intake side of the pump.

Referring to Fig. 8, it will be considered that the high pressure outlets 202, 204 and 206 of the one section of the valve are connected via conduits 208, 210 and 212 to the high pressure inlets of a three place hydraulic motor for driving said motor forwardly, and that the low pressure outlets of the several places of said motor are connected to the low pressure, or suction, inlets 203, 205 and 207 (via a second set of conduits similar to 208, 210 and 212) of the other section of the valve. Thus, in Fig. 8, the upper valve section, described by the even numbered references, controls the operation of the motor when the motor is running forwardly, and the lower valve section, described by the odd numbered references, controls the operation of the motor when it is being driven reversely. During forward driving, conduits 202, 204 and 206 are high pressure outlets to the motor and conduits 203, 205 and 207 are suction return lines from the motor. When driving in reverse, conduits 203, 205 and 207 become the high pressure outlets to the motor and conduits 202, 204 and 206 the suction return lines from the motor. It will be observed with reference to Fig. 8, that the high pressure outlet 86 from the pump leads to both sections of the valve via a common passageway 215. Similarly, the lower pressure outlet to the reservoir or suction side of the pump is in communication with both sections of the valve through a common passageway 216.

*Operation of motor valve*

Operation of the motor valve will now be further explained with reference to Fig. 8 and to the detail sectional views, Figs. 12, 13 and 14, illustrating various positions of the valve element 88 which controls flow to the motor to drive it forwardly.

With the valve elements 88 and 89, and their associated spools, in the position shown in Fig. 8, no high pressure fluid can enter either section of the valve from duct 86. However, under conditions such that the motor is being driven mechanically and is acting as a pump, as in overrunning, fluid can recirculate freely through both sections of the valve. It will be considered that the valve is used in conjunction with a manually operated forward-neutral-reverse selector arranged between the high pressure inlet 86 and the fluid conduits 200 and 201 communicating with chambers 198 and 199 behind the control pistons 112, 113. We will assume the condition wherein such selector is placed in "forward" position and the pump is operated to begin to build up pressure at high pressure inlet 86 to the valve. The pressure in chambers 110 and 111 has no effect on the respective valve elements 88 or 89 until the hydraulic selector means operates one or the other of control pistons 112 and 113, because the effective areas of spools 96 and 98 are substantially equal, the same being true with respect to the effective areas of spools 97 and 99. Further, the coil springs 108 and 109 tend to hold the respective valve elements in the positions shown in Fig. 8. However, the moment that pressure begins to build up in the chambers 110 and 111 with the selector in forward position, pressure is built up also in recess 198 behind control piston 112, moving valve element 88 with its associated spools to the right. Throughout the sequence of operation to be described with reference to Figs. 8, 12, 13 and 14, valve element 89 remains in the same position. At the moment that control piston 112 reaches the limit of its movement to the right, coming up against shoulder 196, the lead spools 94, 96 and 98 will be in the positions shown in dot-dash lines in Fig. 12 at 94', 96', 98'. In such position spool 94 (at 94') is in sealing contact with land 104, whereas spool 96 (at 96') is away from land 186 permitting fluid entering at 86 to the flow around it. Remembering that the diameter D of spool 98 is larger than the diameter d of spool 94 (see Fig. 9), it will be understood that the total effective pressure tending to move valve element 88 to the right is greater than the total effective pressure exerted in the opposite direction. Due to this pressure differential, valve element 88 may continue to move to the right to an extent depending upon the magnitude of the load on the motor. We assume a condition of maximum load on the motor such that a maximum torque ratio is to be called into play, when the valve element 88 will move all the way to the right into the position shown in full lines in Fig. 12. In this position of this valve element, fluid entering the valve at 86 from the pump flows from chamber 110 past the open land 186 into the annular passageway surrounding spool 94, and also past the land 104 and through the annular passageway surrounding spool 92, and past the land 102, and flows from each of the three annular passageways into the high pressure valve outlets 202, 204 and 206 for delivery to the three places of the motor. Any excess pressure is relieved by flow of some of the fluid through the tapered channels 114 of spool 90 into suction outlet 87. This is the condition which corresponds to maximum flow through the valve per revolution of the motor.

As the load upon the motor decreases so that it can be driven more efficiently at a lower torque ratio, pressure in chamber 110 decreases, permitting valve element 88 to drift to the left under the action of biasing spring 108 toward the position shown in Fig. 13. During the first part of this movement of the valve element 88, the flow of excess fluid through the tapered channels in the periphery of spool 90 is gradually pinched off, and during the latter part of this action the flow of fluid around spool 92 is gradually reduced until the flow through tapered channels 116 is pinched off in turn. Fig. 13 illustrates the condition when the flow of fluid around spool 92 has been reduced substantially to zero. Note that in this position the flow around spool 94 is also substantially reduced since the periphery of the spool 94 has begun to overlap the land 104, permitting flow through only the narrower part of tapered channels 118 in its periphery. Whereas in the condition illustrated in Fig. 12, all three motor places are "fully in," in the Fig. 13 position, only one of the motor places is fully in, namely the one which is supplied through valve outlet 206 (intermediate torque or "second gear"). The second motor place may be considered to be partly in because some high pressure fluid is flowing through the tapered channels 118 of spool 94. The balance of the capacity of the second place of the motor is provided from the suction side, as spring-pressed member 132 floats to the right (see Fig. 13), permitting fluid to pass through the openings in spool 92. To supply this partial demand for the second place of the motor and the full demand for the third place of the motor, spring-pressed member 130, associated with the spool 90, also floats to the right but to a somewhat greater extent than member 132. In each case the extent of movement of the spring-pressed members is determined by the requirements of that place (or those places) of the motor which is under suction or intermediate pressures.

Fig. 14 illustrates a condition where the load on the motor has decreased further and to an extent such that only one motor place is fully in (low torque ratio or "high gear"). In this position of the valve element 88, the two places of the motor which are in communication with valve outlets 202, 204 and valve inlets 203, 205 are being driven by the motor shaft and are, in effect, acting as idling pumps, recirculating fluid, i. e. drawing fluid from one side of the valve and returning it at the other side of the valve. To permit fluid to be drawn from the one side of the valve, spring-pressed members 130 and 132 float to the right as shown in Fig. 14. It may be observed at this point that fluid being returned to the valve from all three places of the motor through valve inlets 203, 205 and 207, flows freely around all three spools 119, 117 and 115 and through passageway 216 to satisfy the suction demands of those places of the motor which are acting as idling pumps.

When the valve which I have described is used for torque control in an automatic variable torque hydraulic transmission of the type described in my prior Patent No. 2,697,912, it is not necessary to provide the openings 122, 124, 126, etc. in the spools, nor the spring-pressed members 130, 132, 134, etc., because, with such a transmission, those places of the motor which are acting at any given time as idling pumps, do not recirculate the fluid and therefore there is no demand for flow of fluid from the suction side of the valve. With such an application of my present valve, a "fourth gear" is provided as follows: with a still further decrease in the load on the motor, the valve element 88 moves farther to the left until the spool 96 closes with the land 186, i. e. until it returns to its original position shown in Fig. 8, cutting out all three places of the motor, so that no fluid is being pumped, this being the fourth gear described in my patent aforesaid at column 10, lines 33 et seq.

Further referring to the application of my valve to an automatic transmission in a motor vehicle, we now consider the condition where the vehicle reaches a downgrade and the operator, wishing to hold down the speed, removes his foot from the accelerator. Valve element 88 remains in its extreme left-hand position. All of the places of the motor are, as we have seen, now acting as pumps, taking fluid from the valve through the outlets 202, 204 and 206, and returning it to the valve through the inlets 203, 205 and 207. Under this condition any excess pressure created at the outlet 87 is relieved by movement of the spring-pressed member 136 of spool 96, or 137 of spool 97, or both, to the right, permitting excess fluid to flow reversely to the pump through duct 86. Thus the members 136 and 137 act as pressure balancing valves to permit "over-running."

From the foregoing description of the operation of the motor valve, it will be understood that the actions of the spools 90, 92 and 94 are so correlated as to have an overlapping action for closing their respective passageways, which is substantially the same as has been described with reference to the operation of the pump valve of Figs. 1–7 inclusive, and that the valve has similar advantages in this and other respects which have been described.

The operation of valve element 89 is precisely the same as the operation of valve element 88, valve element 89 coming into play whenever the forward-neutral-reverse selector is moved to a position to place conduit 201 in communication with the high pressure outlet of the pump so as to actuate control piston 113 instead of control piston 112.

*Modified valve constructions*

Fig. 15 which is described as a detail sectional view similar to Figs. 12–14, illustrates a modified form of motor valve in which one or more of the control spools 90, 92, 94 are mounted to slide along valve element 88. The position of valve element 88 in Fig. 15 corresponds to that in Fig. 14, and it will be observed that spool 90 is moved from the dot-dash position indicated at 90' to the position shown in full lines, permitting an increased flow from the suction side of the valve into the valve outlets 202 and 204 to fulfill the suction demands of the two places of the motor which are acting as idling pumps. The only structural difference between the valves of Fig.

14 and Fig. 15 is that in the latter, pistons 90, 92 and 94 are mounted so as to slide longitudinally with respect to the valve stem 160. For this purpose I have provided a series of spacing sleeves 217, 218, 219, 220, and a series of rings 221, 222, and 223, these rings serving as positioning stops to determine the normal position of the spools under the biasing action of the coil springs 224, 225 and 226. These springs urge the respective spools and the associated pressure balancing valves 227, 228 and 229 to the left, with the spools against the stops and the valves against the spools. Whenever the suction demand of the idling places of the motor reaches an amount which cannot be supplied through the openings in the spools, one or more of the spools can move bodily to the right as has the spool 90 in Fig. 15. With the parts in the position there shown, the suction demand of the second motor place is supplied through the openings in spool 92 upon movement of the spring-pressed member 228 to the right. This imposes a demand upon the section of the valve which is supplying the suction of the third place of the motor through outlet 202, so that the combined demand of these two places requires a very substantial flow past the land 100. The bodily movement of spool 90 permits flow not only through the openings in the spool but also through the tapered channels 114 in its periphery. Except in the respects which have been noted, the construction, operation and advantages of the valve of Fig. 15 are the same as have been described with reference to Figs. 8–14 inclusive.

Fig. 16 is a detail sectional view showing a portion of one of the spools with adjacent valve structure, in which the spool and valve structure has been modified in respect of the arrangement of the tapered section, or series of tapered channels. Here such tapered section or series of tapered channels 230 are formed in the walls of the cylinders 78 instead of in the periphery of the spool. Spool 231 may be made somewhat shorter and the contiguous land 232 correspondingly lengthened to afford room for the tapered channels 230. When the spool 231 is in the position shown in Fig. 16, the passageways around the periphery of the piston are restricted, the flow of fluid being confined to the narrower portions of the tapered channels 230.

Fig. 17 is a view similar to Fig. 16, illustrating a further modification in which tapered channels are formed in both the cylinder walls and the contiguous peripheral surfaces of the spool. Thus we have a series of tapered channels 223 in the walls of the cylinder at the land 234, and another series of tapered channels 235 in the peripheral surfaces of spool 236. While in the specific construction shown, tapered channels 233 are directly opposite tapered channels 235, these tapered channels may, if desired, be offset from one another circumferentially. Where there are two series of tapered channels, one series in the cylinder walls and the other series in the periphery of the spool, this would mean that the two series of channels are arranged in staggered relation.

In the further modification shown in Fig. 18, the tapered channels are omitted altogether. This may be considered to represent a pump valve which in all other respects is the same as the construction of Figs. 1–7 inclusive, with the parts being in the position of operation illustrated in Fig. 5, wherein valve element 26 has been moved to the right to an extent which brings the peripheral sealing surface of spool 27′ into position to block the passageway around the spool by closing with the walls of cylinder 20 at the land 30 beyond port 21. This causes full output of one place of the pump to pass through port 21 directly into the high pressure outlet 24 for operation of the motor at low speed. The peripheral sealing surface of spool 28′ is nearer land 31 than is the peripheral sealing surface of spool 29′ to the land 32. Thus, flow through the passageway around spool 28′ is just beginning to be restricted, building up pressure between spools 27′ and 28′ preparatory to opening of the spring-pressed member 38′ to begin discharge from the second place of the pump to the high pressure outlet 24. While the blending or overlapping of the action of the several spools is much smoother when the tapered channels, described with reference to the previous embodiments, are employed, I recognize that for some applications of the valve the construction shown in Fig. 18 may fulfill the general requirements.

Fig. 19 is a diagram illustrating a particular application of my invention where it is desired to employ a pump valve and a motor valve in combination for manual control of the output of a multiple-place pump and automatic control of the input to a multiple-place motor in conjunction with a manual forward-neutral-reverse selector, to give a wide range of torque controls in a semi-automatic transmission. The pump valve 237 of this combination, although shown in somewhat simplified diagrammatic form, is of essentially the same construction as has been described with reference to Figs. 1 to 7 inclusive. Consequently, like reference numerals have been employed to designate like parts of the general arrangement, making it unnecessary to repeat a specific description of the valve. However, it may be observed that high pressure outlet 24 to the motor, or motor valve, is shown in the diagram as being in the plane of the drawing instead of at right angles thereto as in Fig. 1.

The motor valve 238 of the combination likewise is of a construction generally similar to that described with reference to Figs. 9–14 inclusive, and again like references have been employed to avoid any need for repetition of descriptive detail. However, it may be observed that the disposition of the motor valve in the diagram corresponds to the disposition which would be obtained by turning Fig. 8 of the drawings upside down so that the section of the valve which controls the torque ratios in driving the motor forwardly is the one which appears at the lower side of valve 238 of Fig. 19. Also, the high pressure motor valve inlet 86 and low pressure outlet 216 are in the plane of the diagram of Fig. 19 instead of at right angles thereto as in Fig. 8. The same is true with respect to the inlet and outlet conduits 202 to 207 inclusive.

Pump valve 237 is actuated by the manual control lever 239 which is movable from the position shown in full lines to the several alternate positions shown in dot-dash lines to be placed in neutral, first place, second place, third place, as desired. The first place position shown in full lines disposes the valve element 26 in a position which corresponds to that which has been described heretofore with reference to Fig. 6. The high-pressure discharge outlet 24 of the pump valve is connected by conduit 240 to the high pressure inlet 86 of the motor valve 238. Low pressure return 216 extends to a reservoir (not shown), or to the suction return side of the pump. A branch conduit 241 extends from conduit 240 to a three-way valve 242 manually controlled by a suitable control lever 243 which is movable selectively to positions for driving the motor forwardly or in reverse, or to place it in neutral. With the valve stem 244 in the forward position as shown in the diagram, the branch high pressure conduit 241 is placed in communication with conduit 200 leading to the cylinder of control piston 112 of the motor valve. Thus, with the controls 239 and 243 in the positions shown in the diagram, and the pump in operation, control piston 112 is moved to the left into the position shown, after which the operation of valve element 88 is controlled automatically by the load on the motor, and it floats from one end to the other of its cylinder in the manner which has been described in detail with reference to Figs. 8–14 inclusive. When control lever 243 is placed in the reverse position, valve stem 244 of the three-way selector valve assumes a position in which branch conduit 241 is placed in communication with conduit 201 leading to the cylinder of control piston 113, when valve element 88 will be held in its extreme right-hand position by spring 108, and valve element 89 placed into position for automatic operation. Control pistons 112 and 113 act as starters, so to speak, for selecting which of the valve elements of motor valve 238 will be placed in automatic operation. When it is valve element 88 that is placed in automatic operation, the drive is forward. When it is the valve element 89 which is placed in operation, the drive is in reverse. In either case the drive becomes fully automatic once the selector lever 243 has been operated. When the selector is in the neutral position, branch conduit 241 is placed in communication with the low pressure return line 245 leading to the reservoir or to the suction side of the pump, and pressure in both of the conduits 200 and 201 is relieved.

The general arrangement shown in the diagram, Fig. 19, may be described as an automatic torque control which has three selective "ranges" of automatic operation and a selective forward-reverse control. The pump valve 237 provides the range selection, and gives a choice of high, low or intermediate torque ranges. In each torque range, the motor valve 238 gives a superimposed automatic torque control which shifts throughout its automatic range in the smooth, continuous fashion which has already been explained.

The terms and expressions which I have employed are used in a descriptive and not a limiting sense, and I have no intention of excluding such equivalents of the invention described, or of portions thereof, as fall within the purview of the claims.

I claim:

1. A multiple control valve for fluid pumps, motors and transmissions, comprising a cylinder, at least two ports spaced longitudinally along said cylinder for communication with the respective places of a multiple place fluid power device, lands between the ports, a high pressure duct adjacent one end of said cylinder for communication with another fluid power device, and a low pressure outlet adjacent the other end of said cylinder, a valve element movable lengthwise within said cylinder, and spools on said valve element, said spools having a sliding engagement with said cylinder, each of said spools having a peripheral sealing surface which is shorter than the longitudinal dimension of an adjacent one of said ports to provide a fluid passageway around the outside of the spool whenever the spool lies between the ends of its adjacent port, and each of said spools being movable into a position to block said passageway by closing with the walls of said cylinder at the lands beyond the respective ports, the spools being so spaced that when two successive spools lie opposite their respective ports the peripheral sealing surface of one spool is nearer to the land beyond its respective port than is that of the other spool to the land beyond its respective port.

2. A multiple control valve constructed in accordance with claim 1, in which contiguous surfaces of the cylinder and at least one of said spools include a tapered section so that as such spool closes with the walls of the cylinder at the land beyond its respective port, the fluid passageway around the outside of the spool is gradually diminished in size whereby the valving action of successive spools is overlapped to produce smooth continuous flow control.

3. A multiple control valve constructed in accordance with claim 1, in which contiguous surfaces of the cylinder and at least one of said spools include a series of peripherally arranged tapered channels.

4. A multiple control valve constructed in accordance with claim 1, in which the periphery of at least one of said spools has a tapered section.

5. A multiple control valve constructed in accordance with claim 1, in which at least one of said spools has a series of peripherally arranged tapered channels.

6. A multiple control valve constructed in accordance with claim 1, in which the spools include tapered sections at their peripheries permitting said other spool to partially close its said passageway before said one spool has completely closed its respective passageway whereby the closing actions of the spools are overlapped.

7. A multiple control valve constructed in accordance with claim 1, in which at least one of said spools includes an opening extending therethrough and a spring-pressed member closing said opening.

8. A multiple control valve constructed in accordance with claim 1, in which at least one of said spools includes a series of peripherally arranged tapered channels and has an opening extending therethrough and a spring-pressed member closing said opening.

9. A multiple control valve comprising a pair of cylinders each having at least two ports spaced longitudinally thereof for communication with the respective places of a multiple place fluid motor, lands between the ports, the ports of one of said cylinders being arranged for communication with one side of the motor to drive it forwardly and those of the other of said cylinders being arranged for communication with the other side of the motor to drive it reversely, a high pressure duct connected adjacent one end of the cylinders for communication with the high pressure output side of a fluid pump, and a low pressure outlet connected near the other end of the cylinders, a valve element in each cylinder movable lengthwise thereof, and spools on each such valve element, said spools having a sliding engagement with their respective cylinders, each of said spools having a peripheral sealing surface which is shorter than the longitudinal dimension of an adjacent one of said ports to provide a fluid passageway around the outside of the spool whenever the spool lies between the ends of its adjacent port, and each of said spools being movable into a position to block said passageway by closing with the walls of its respective cylinder at the lands beyond the respective ports, the spools in each cylinder being so spaced that when two successive spools lie opposite their respective ports the peripheral sealing surface of one spool is nearer to the land beyond its respective port than is that of the other spool to the land beyond its respective port, a pair of spools on each of said valve elements adjacent the high pressure end of the cylinders, said last-named spools each having a greater effective area than that of any of the previously-named spools, a spring biasing each said valve element toward the low pressure end of its respective cylinder to a position in which said high pressure duct communicates with the spaces between the spools of the respective pairs of last-named spools, and fluid piston means adjacent the low pressure end of each cylinder arranged for selective operation to move either of said valve elements toward the high pressure end of its respective cylinder to a position in which high pressure fluid flows beyond the respective last-named pair of spools to further move the selected valve element against the action of its biasing spring for automatic control of the position of such valve element in accordance with torque requirements.

10. A multiple control valve constructed in accordance with claim 9, in which the first-named spools include openings extending therethrough and a spring-pressed member closing said openings in each such spool.

11. A multiple control valve constructed in accordance with claim 1, in which said fluid passageway around the outside of the spool is of generally annular form.

12. A multiple control valve constructed in accordance with claim 1, in which at least one of said spools is mounted to slide lengthwise along said valve element, a shoulder on said valve element for engagement by such sliding spool, and a spring biasing such spool toward a position against said shoulder.

13. A multiple control valve constructed in accordance with claim 1, in which at least one of said spools includes an opening extending therethrough, a spring-pressed member closing said opening, such spool being mounted to slide lengthwise along said valve element, a shoulder on said valve element for engagement by such spool, and a spring biasing such spool toward a position against said shoulder.

14. A multiple control valve constructed in accordance with claim 13, in which the spring which presses said member against said opening in the spool serves also as the spring for biasing such spool toward its position against said shoulder.

References Cited in the file of this patent

UNITED STATES PATENTS

| | | |
|---|---|---|
| 1,022,758 | Seaver | Apr. 9, 1912 |
| 2,581,430 | Mork | Jan. 8, 1952 |
| 2,611,307 | Strehlow | Sept. 23, 1952 |
| 2,614,503 | Berry | Oct. 21, 1952 |

FOREIGN PATENTS

| | | |
|---|---|---|
| 26,690 | Great Britain | 1909 |